United States Patent Office 3,155,070
Patented Nov. 3, 1964

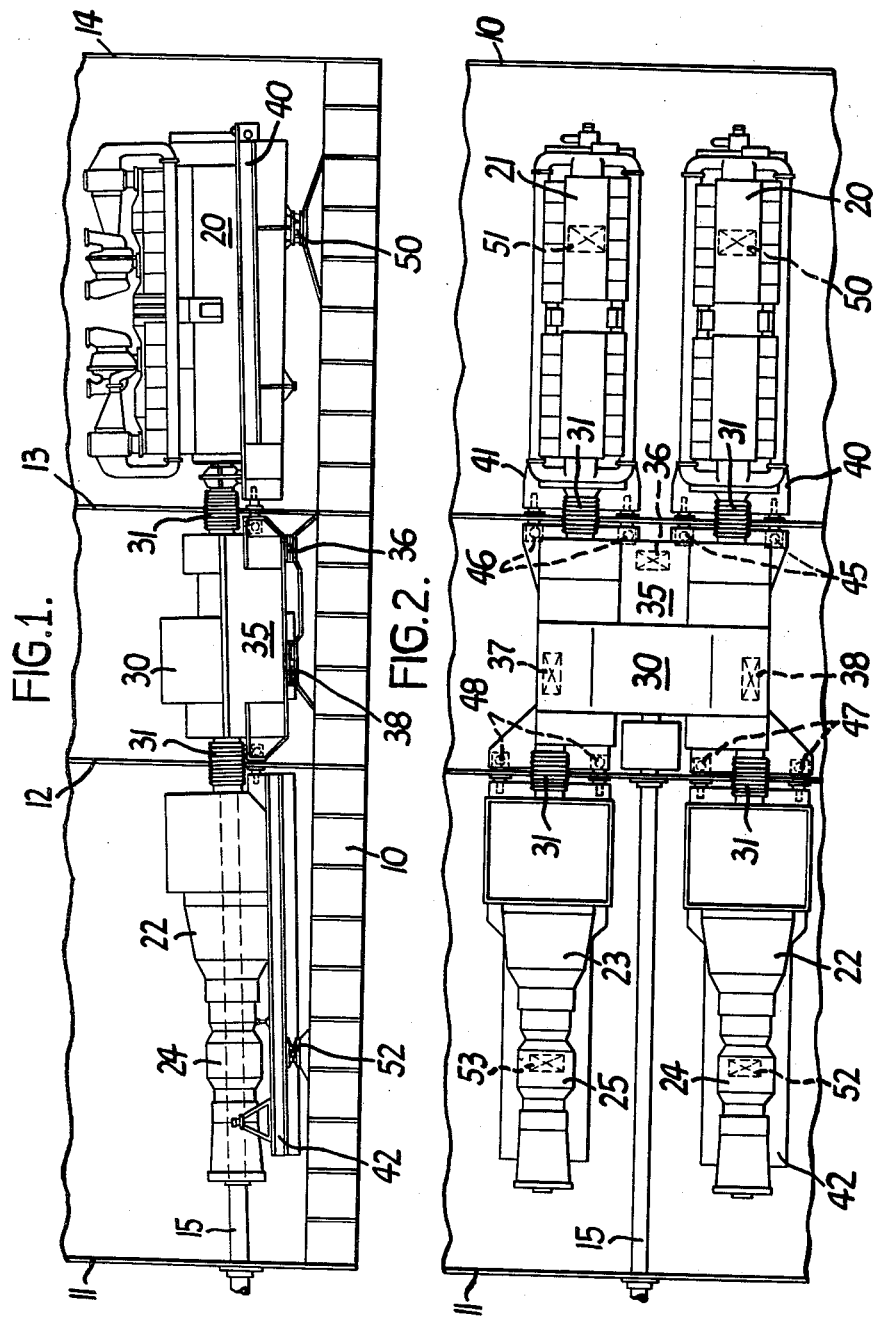

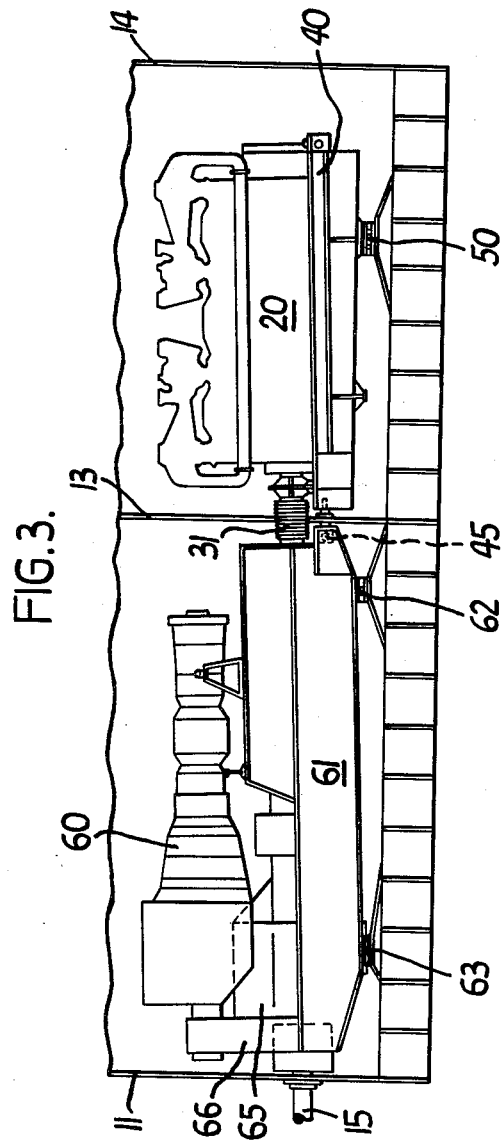

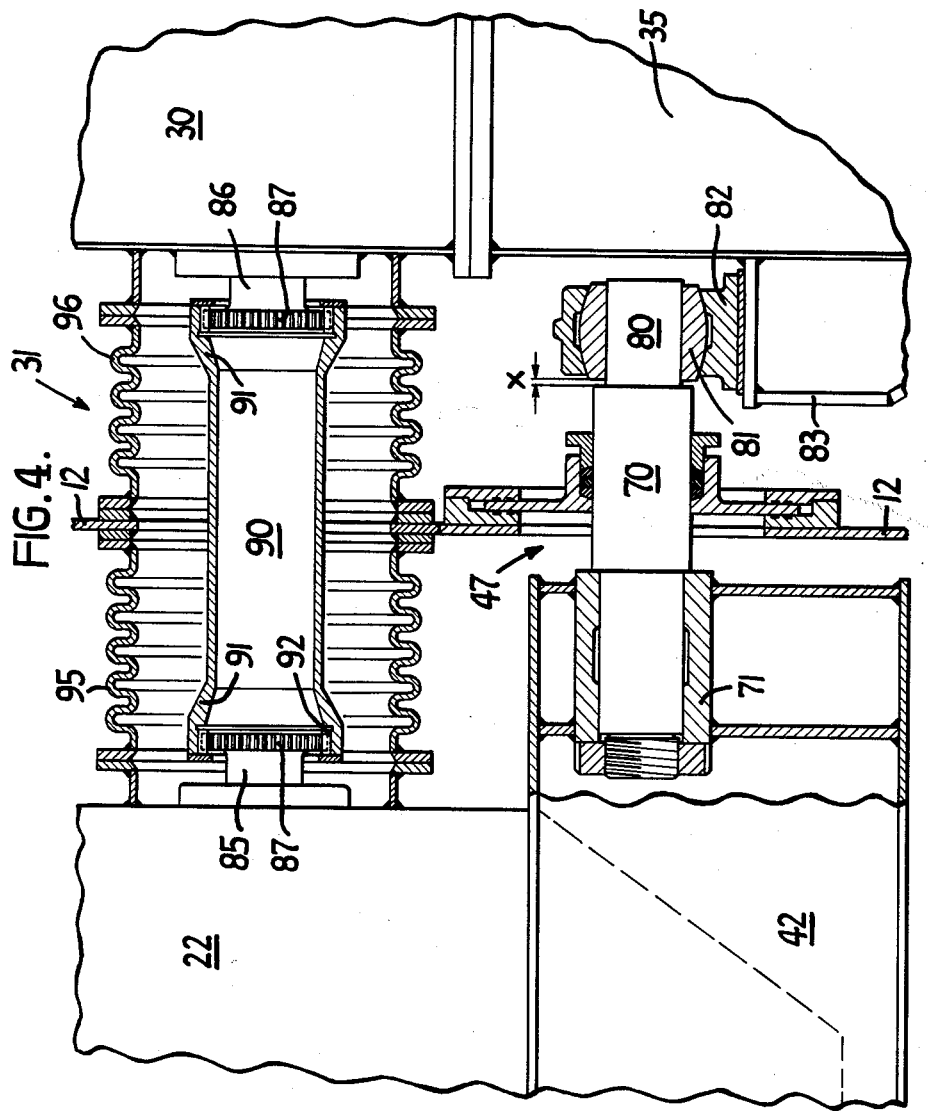

3,155,070
DRIVE SYSTEM AND MOUNTING FOR MULTIPLE MARINE ENGINES IN SHIPS
Oskar Jebens and Ulrich Wagner, Hamburg, Germany, assignors to Wagner-Hockdruck-Dampfturbinen-Gesellschaft, Hamburg, Germany, a corporation of Germany
Filed July 15, 1963, Ser. No. 295,161
Claims priority, application Germany, July 21, 1962, W 32,648; Aug. 22, 1962, W 32,820
17 Claims. (Cl. 115—.5)

This invention relates to the power transmission drive systems and engine mounting arrangements in ships having a plurality of driving engines supplying power to a common propellor shaft through power transmission gearing or otherwise, and, more particularly, to such systems and arrangement in which at least some of the engine or transmission components are mounted directly on an elastic or non-rigid ship hull structure in a manner producing relative movements therebetween to be accommodated by articulated drive or power transmission elements.

As will be understood, in such multi-engine ship driving arrangements where a plurality of engines deliver power to a common propellor shaft, the engines are usually arranged longitudinally on opposite sides of a gear power transmission arrangement and/or symmetrically to the axis of the propellor shaft. Generally, also, the engines are separately and individually supported, usually at three points, on the ship's bottom, and, hence, in statically determined fashion with respect thereto, with the engines and other driving elements being interconnected by articulated torque transmission devices such as geared couplings, universal joints, etc., for accommodating inevitable respective movement among the several engines and drive components.

Such articulated driving means, as well understood, permit certain limited respective movements or displacements of the individual components without introducing impermissibly high bending moments into the shafts or other elements of the power transmission. The extent of such displacing movement permitted by such articulated drives, however, may be quite limited, especially with higher speed engines which are more sensitive to misalignments in the driving connections and/or angular displacements with respect to the power transmitting shafts.

Thus, as well understood, a geared coupling between engine and shaft accommodates but very slight angular displacement of the engine and shaft and the extent of this displacement decreases rapidly as the engine speed increases. The use of universal joints, of course, permits considerably greater angular misalignment between shaft and engine, but even this arrangement is severely limited, particularly at higher speeds where there is danger of severe vibration being generated at extremes of angular displacement.

Although such arrangements may be designed to accommodate the necessary displacements occurring with conventional marine engines as conventionally arranged, difficulties may be experienced with the utilization of higher speed engines and/or situations where the inevitable displacement among the engine and drive components is greater. This latter situation may particularly occur with so-called "soft bottom" ships in which the hull is designed to be elastic or non-rigid for elastically taking up shocks from the outside. Due to the large size of marine engines in such ships, the relative displacement of one engine with respect to another or with respect to the propellor shaft as the ship's hull twists or gives against pounding of the sea from outside may become quite large and, indeed, to an extent where considerable difficulty may be experienced in attempting to accommodate such displacements or misalignments by conventional techniques.

Even if it is attempted to accommodate such large displacements by further separating the interconnected driving components and further lengthening the power transmitting shafts between universal joints for the purpose of minimizing the angular displacement of each joint, the result may be so to expand the area necessary to accommodate the entire power plant that valuable cargo space within the ship is wasted. Also, a further complication or difficulty may be interjected into the foregoing situation if it is desired to incorporate as a part of the engines or power plant (as, for example, for providing additional high speed power) gas turbine engines (especially those where the driving gases are provided by an aviation-type turbojet engine), because such engines are particularly sensitive to shaft displacement at the high speeds of operation desired, and the high speeds thereof greatly increase the vibration-generating effects of universal joints, especially if the angularity thereof is especially pronounced.

According to this invention, however, there are provided drive systems and engine mounting arrangements whereby the inevitable displacements among the various components are reduced to the values well within a range which can readily be accommodated by articulated couplings even when high speed gas turbine engines are utilized and even with mounting in "soft bottom" ships, with these enhanced advantages being achieved by, for example, pivotally or cardanically interconnecting the engine frames with the gear transmission mountings at one end thereof, while the opposite ends of the engine frames are supported directly on the ship bottom by an articulated foot. In this manner, even large deformations of the ship bottom displaces the engines so that the mounting frames thereof are swung around the pivot axes to the transmission, whereby the angular displacement of drive shafts are many times less than with conventional supporting techniques, and even in the ratio by which the distance from the transmission to the supporting foot of the engine increases. As a further feature of this invention, arrangements are also provided for mounting high speed gas turbine engines rigidly with respect to the power transmission for maximum effectiveness, yet while still incorporating limited articulated interconnections between the main driving engines and the power transmission to the propellor shaft.

With the foregoing and additional objects in view, this invention will now be described in more detail, and other objects and advantages thereof will be apparent from the following description, the accompanying drawings, and the appended claims.

In the drawings:

FIG. 1 is a somewhat diagrammatic or schematic side elevation view of a drive system and engine mounting arrangement embodying and for practicing this invention and including marine diesel engines for normal cruising speed and gas turbine engines for auxiliary application for higher speed propulsion;

FIG. 2 is the arrangement of FIG. 1 shown in somewhat diagrammatic or schematic top plan view;

FIG. 3 is a view similar to FIG. 1 of another arrangement embodying and for practicing this invention with the gas turbine engine mounted on the same frame as the power transmission gearing elements; and FIG. 4 is a partial detailed view partially in axial section and on a larger scale of a form of the articulated drive coupling and cardanic mounting arrangements of the previously noted views.

Referring to the drawings, in which like characters of reference refer to like parts throughout the several views thereof, there is indicated, somewhat diagrammatically in FIGS. 1 and 2, a drive system and engine mounting arrangement embodying and for practicing this invention and as applied particularly to a ship power plant comprising two conventional supercharged diesel engines in driving engagement with a common propellor shaft for providing the normal crusing speed power for the vessel, along with two gas turbine engines, also geared to the same common propellor shaft for auxiliary connection into the power system to supply high speed power, all being positioned in a so-called "soft bottom" ship having an elastic or non-rigid hull structure adapted to flex or give in absorbing shocks from outside the vessel.

Thus, the "soft" ship bottom is indicated generally at 10, with watertight bulkheads 11–14 preferably subdividing the entire engine power plant space into separate watertight compartments in conventional manner, and with the driven propellor shaft being indicated at 15. Two conventional supercharged marine diesel engines are indicated at 20 and 21, as being separately mounted parallel to each other and symmetrically on opposite sides of propellor shaft 15, in the manner to be described hereinafter, for maintaining the normal cruising speed of the ship, while two gas turbine engines 22 and 23 are also indicated for supplying auxiliary or optional high speed power, and also symmetrically positioned on opposite sides of propellor shaft 15, the gas turbine engines being supplied with propellant gases produced from aviation-type turbojet engines indicated at 24 and 25.

All four of the driving engines 20–23 are separately and individually connected into a gear transmission indicated at 30 for transmission of power from the engine to propellor shaft 15, each of said power transmitting connections being indicated at 31 as including an articulated coupling arrangement passing in watertight manner through the various bulkheads 12, 13, etc., and as described in more detail hereafter and as exemplified by the illustration of FIG. 4. As will be understood, individual clutching arrangements are provided for separately and individually connecting and disconnecting each of the engines 20–23 with the power transmission arrangement 30 (the internal construction of which, being conventional or well understood, is not illustrated in detail) for transmission therethrough to propellor shaft 15 common to all four engines.

A gear block frame or transmission frame 35 is provided for supporting transmission 30 and mounted, in well understood or conventional manner, on the ship bottom 10 by a three-point suspension or mounting indicated generally at 36–38 for generally rigid or static support of transmission frame 35 on and with respect to bottom 10. Two diesel engine mounting frames 40 and 41 are provided for supporting engines 20 and 21, respectively, and two gas turbine engine mounting frames 42 and 43 are provided for supporting gas turbine engines 22 and 23, respectively. One end of each of engine frames 40–43 is pivotally or cardanically affixed to and supported by rigid transmission frame 35 as indicated by the pairs of cardanic or universal joints 45–48, each of which preferably penetrates the bulkheads 12 and 13, respectively, in watertight manner as embodying a construction as, for example, illustrated in more detail in FIG. 4.

The opposite ends of each of the engine frames 40–43 are individually supported by single articulated feet 50–53 directly on the ship bottom 10 and in known manner to permit limited although sufficient angular movement of the engine frames with respect to the ship bottom upon giving or twisting thereof. Supporting feet 50–53 are arranged and constructed, in known manner, to avoid the transmission of torque therethrough, while readily accommodating angular movements of the ship bottom with respect to the engine frame. Hence, the double and cardanic supporting of the opposite ends of each of the engine frames 40–43 on transmission frame 35 by the double pivots or universal gimbal joints 45–48 provides the desired result, and any relative torques of the various engines 20–23 are taken up primarily and directly by the transmission frame 35, without being transmitted through the respective engine supporting frames 40–43, thus avoiding tendency to warp the engine frames. The arrangement of hanging one end of each of the engine frames on rigid transmission frame 35 with the opposite end supported in one-point manner on the ship bottom also provides for eliminating substantial displacements of any of the individual engines with respect to the axes of the respective drive shaft coupling arrangements 31, other than pivoting displacements about the various universal joints 45–48, no matter how great may be the actual movements or displacements of the hull and ship bottom 10 in the various different and separated areas of the respective supports 50–53 for the various engine frames.

Referring now to FIG. 3, there is indicated in side elevation a drive system and mounting arrangement embodying and for practicing this invention and having the same number of diesel and gas turbine engines as in FIGS. 1 and 2, although the number of articulated driving arrangements between engine and gear block has been somewhat reduced and the overall length of the entire power plant substantially reduced. Thus, the ship bottom is again indicated at 10, with watertight bulkheads 11 and 14 placed somewhat closer together to form the engine room, which is divided into two watertight compartments, instead of three, by bulkhead 13, while propellor shaft 15 is still driven in common by all four engines. Although there are two diesel engines, such as 20 and 21, in this embodiment, only diesel engine 20 is shown. Similarly, two gas turbine engines are provided symmetrically disposed on opposite sides of the propellor shaft 15 as in FIG. 2, but only one such engine, indicated at 60, is visible in FIG. 3. It is to be understood that FIG. 3 is generally similar to the diagrammatic showing of FIG. 1, and that the parts visible in FIG. 3 are repeated on the opposite side of propellor shaft 15 (as in FIG. 2) in this embodiment.

A somewhat elongated transmission supporting frame 61 is provided and supported from ship bottom 10 by a three point suspension (two points 62 and 63 of which are shown) similar to the suspension 36–38 in FIGS. 1 and 2. On frame 61 are supported both a gear transmission arrangement indicated at 65 for receiving power from all four of the engines and transmitting it to propellor shaft 15, as well as the two gas turbine engines (one of which is shown at 60). This arrangement is particularly advantageous for rather light weight turbine engines because, if they are arranged directly on the ship's bottom 10, they may experience rather large displacements as a result of shocks or forces acting on the bottom from outside and because of the light weighted engine. In order to remedy or accommodate this difficulty, complicated supporting springs and vibration dampers might be needed if the light weight turbine engine were mounted as in FIG. 1, which additional mechanism would require additional special maintenance. With turbine engines such as 60 of light enough weight for mounting directly on transmission frame 61, as in FIG. 3, both the effects of such difficulties and angular displacements between the turbine engines and gear transmission 12 (interconnected in conventional or well-known manner as by gear train 66) may be substantially eliminated or minimized.

Diesel engine supporting frames, such as 40 and 41, are provided for the diesel engines in this embodiment, and one end of frame 61 in the same manner as in FIGS. 1 and 2 through universal pivot joints 45 and 46, etc., while the opposite end of the diesel engine frames are supported on bottom 10 in the same manner as previously described by articulated feet 50, etc., and an articulated drive coupling 31 provides driving engagement between the diesel engines and gear transmission 65, as previously described, preferably penetrating bulkhead 13 in watertight manner. Thus, as will be understood from the foregoing, the diesel engines in the FIG.

3 embodiment are mounted and supported, as are those in the embodiments of FIGS. 1 and 2, to be pivoted about gimbal supports 45 to minimize angular displacements along couplings 31 despite pronounced individual displacements of the different areas of ship bottom 10 adjacent articulated feet 50, etc.

As will also be understood, with such long power plant systems as described above, it may be desired or required to subdivide the power plant or engine room space in the ship by watertight bulkheads such as 11–14 to form conventional watertight compartments of desired size for the safety of the ship. As described above, with arrangements embodying and for practicing this invention, it may be desired to place such watertight bulkheads as 12 and/or 13 in either of the embodiments of FIG. 1 or 3 so as to separate the diesel engines from the gas turbine engines and/or the gear transmissions, leaving each in a separate compartment, whereby the flooding of one engine compartment may still permit operation of the engines in the other engine compartment to maintain some moderate maneuverability of the ship even during an extreme emergency.

Accordingly, as previously noted, the various universal joints or cardanic pivots 45–48, as well as the various articulated power transmitting couplings 31, are preferably arranged to penetrate the respective watertight bulkheads in watertight manner, despite the necessary articulation and movement thereof. Satisfactory structures for accomplishing the foregoing ends are indicated in FIG. 4 on a somewhat larger scale and in more detail. It is to be understood that this illustration relates primarily to the universal pivot 47 and the coupling 31 connecting turbine engine 22 with power transmission 30 in FIG. 1, for illustrative purposes, and that substantially the same structure is duplicated with regard to all the other engines and bulkheads as illustrated in FIGS. 1–3.

Thus, regarding the cardanic mounting of one end of engine frame 42 to transmission frame 35, there is shown a supporting pivot bolt or pin 70 affixed to a bracket or socket 71 on engine frame 42, and penetrating bulkhead 12 through a stuffing box 72 having a flange 73 thereon for trans-axial freedom of movement in an annular slot 74 around an enlarged opening 75 in bulkhead 12, all to provide, as will be understood, watertight penetration of bulkhead 12 by bolt 70 notwithstanding movement thereof as required.

The other end of pin 70 is provided with a reduced diameter bearing portion 80 and is received within a spherical bearing bushing 81 carried by journal 82 mounted on a bracket 83 on transmission frame 35. Bearing portion 80 is slideably received in bushing 81, and is developed to have a free axial sliding movement therein to an extent indicated by X in the drawing, while bushing 81 is rotatably received in journal 82 for rotating movement about the axis of pin 70 as well as limited angular movement along the outer spherical bearing surfaces of bushing 81. As will be understood from the foregoing, such an arrangement permits virtually universal movement of the opposite end of engine frame 42 vertically, transversely, and angularly, with respect to transmission frame 35. In view of the supporting of the opposite end of the engine frame 42 at but a single articulated foot 52, even quite substantial displacements or movements of foot 52 with respect to transmission frame 35 are translated into much smaller angular displacements about the pivot axes of the pivoting arrangement 47, 48, etc. As further illustrative of such a cardanic mounting arrangement, satisfactory results are achieved in accordance herewith if the extent X of axial play of pivot pin 70 with respect to bushing 81 in journal 82 is at least as great as the maximum decrease or shortening of the distance between the pivoted joint 47 and articulated foot 52 caused by elastic deformation of the ship bottom 10, which dimensional relationship also is to be understood as applying in the same manner to all the various cardanic pivot supports 45–48 and the respective articulated supporting feet 50–52.

Also, in the upper portion of FIG. 4 there is illustrated one form of articulated power transmitting coupling for connecting engine 22 with transmission 30, which arrangement is to be understood as illustrative of all four of the couplings 31 in the embodiments of FIGS. 1 and 2, as well as FIG. 3. Thus, drive shaft 85 of engine 22 and input shaft 86 of gear transmission 30 each carries at the end thereof a toothed gear coupling element 87. A gear coupling sleeve 90 is provided, in known manner, having enlarged end portions 91 with internal diameter somewhat greater than elements 87 and carrying on the inside surface axial splines for meshing and torque-transmitting engagement with the external teeth on coupling elements 87.

As will be understood, the axial and radial dimensions of splines 92 and the oversize internal diameter and axial extent of enlarged end portions 91 on coupling sleeve 90 permit and accommodate limited but free axial and angular displacement of either drive shaft 85 or input shaft 86 with respect to the other while still positively transmitting torque therebetween through engagement of the external teeth on coupling elements 87 with splines 92 within sleeve 90. Also, with angular and axial play permitted at each end of coupling sleeve 90, only one-half the total angular displacement of the axes of shafts 85 and 86 need be accommodated at each end of coupling sleeve 90, and, since this total maximum displacement is both substantially reduced by the cardanic pivot support described above and is also predictable from the design of the ship, etc., the total displacement is readily accommodated with a direct gear coupling arrangement as illustrated, although, as will be understood, other articulated power transmission constructions may also satisfactorily be used in accordance herewith.

In order to permit coupling sleeve 90 to penetrate bulkhead 12 for free angular movement as may be required and yet to maintain a watertight condition, bellows members 95 and 96 are provided surrounding coupling sleeve 90 and connected in completely watertight fashion with and between bulkhead 12 and engine 22 and transmission 30 as indicated in the drawing, with such bellows members being sufficiently flexible to accommodate the maximum relative movement expected between either engine 22 or gear transmission 30 and bulkhead 12 as the case may be.

Also, as will be understood from the foregoing, virtually all angular displacement between the axes of drive shaft 85 and input shaft 86 may be substantially eliminated if the cardanic pivot mountings such as 45–48 are located at the height of the juncture or angular intersection of the axes of the engine drive shaft and transmission input shaft. In such case, however, the respective articulated feet, such as 50–52 must be arranged to accommodate the entire maximum change in distance between the feet and the cardanic pivot supports, rather than having such dimension change being accommodated, in the preferred manner, by axial play between pivot pin 70 and bushing 81 as described.

As will be apparent from the foregoing, there are provided in accordance herewith drive systems and engine mounting arrangements which readily and in simple fashion accommodate even the large translating and angular displacements among the driving elements to be encountered in "soft bottom" ships, and so as to minimize the articulation necessary in driving and power transmission couplings among the members of the power plant, particularly when at least some of the driving engines operate at relatively high speeds as compared with conventional marine engines. Similarly, the arrangements in accordance herewith facilitate and expand the freedom and flexibility of placement of the various engines with respect to each other and with respect to a common power transmission and propellor shaft, as may be desired for other reasons in the ship design, while also providing for watertight bulkheads separating at least some of the engines from others and/or from the gear transmission so as to increase the possibility that, even in the event of flooding of one compartment, at least some of the engines will remain operative to provide some maneuverability even in the case of disaster.

While the foregoing arrangements and apparatus form preferred embodiments of this invention, this invention is not limited to these precise arrangements and apparatus, and changes may be made therein without departing from the scope of this invention which is defined in the appended claims.

What is claimed is:

1. In an arrangement of power transmission elements and engines for ships having a plurality of separate engines transmitting power to a common propellor shaft by means of articulated power transmission elements, the combination which comprises a main frame for at least a portion of said power transmission elements, means for supporting said main frame directly on hull portions of said ship, individual engine-supporting frames for at least a portion of said separate engines, cardanic pivot means for supporting one end of each of said engine-supporting frames on said main frame for angular and translating movement with respect thereto, articulated support means for supporting the opposite end of each said engine-supporting frame on said hull portions of said ship, and articulated torque transmission means interconnecting said engines with said transmission elements and adapted for accommodating angular and translating movements therebetween.

2. In a power plant system and engine mounting arrangement for ships having a plurality of different engines separately supported from the hull structure of said ships and transmitting power to a common propellor shaft through a main power transmission device, the combination which comprises a frame for said power transmission device, means for supporting said frame directly on said hull structure, separate engine-supporting frames for said separate engines, cardanic pivot means for supporting one end of each said engine-supporting frame on said transmission device frame for limited free angular movement with respect thereto, articulated means for supporting the opposite end of each said engine-supporting frame directly on said hull structure at points substantially spaced from said transmission device frame and for movement of said engine-supporting frames with respect to said transmission device frame, and articulated torque transmitting means interconnecting said engines with said power transmission device for torque transmission thereto from said engines notwithstanding angular displacement thereof around the axes of said cardanic pivot means.

3. In an arrangement of power transmission and engines for ships having a plurality of separate engines transmitting power to a common propellor shaft by means of articulated power transmission elements, the combination which comprises a main frame for said power transmission elements, means for supporting said main frame directly on hull portions of said ship independently of said separate engines, individual engine-supporting frames for each of said plurality of separate engines, cardanic pivot means for supporting one end of each of said engine-supporting frames on said main frame for angular and translating movement with respect thereto, articulated support means for supporting the opposite end of each said engine-supporting frame on said ship's hull structure, and articulated torque transmission means interconnecting each said engine with said transmission means and adapted for accommodating angular and translating movements therebetween.

4. In a power plant system and engine mounting arrangement for ships having non-rigid and elastic hull structures and a plurality of different engines separately supported from said hull structure and transmitting power to a common propellor shaft through a main power transmission device, the combination which comprises a frame for said power transmission device, means for supporting said frame directly on said elastic hull structure, separate engine-supporting frames for said plurality of separate engines, cardanic pivot means for supporting one end of each said engine-supporting frame on said transmission device frame for limited free angular movement with respect thereto, articulated means for supporting the opposite end of each said engine-supporting frame directly on said hull structure at points substantially spaced from said transmission device frame and for movement of said engine-supporting frames with respect to said transmission device frame upon flexing and like displacements of said engine-supporting frames and said engines thereon with respect to said power transmission device, and articulated torque transmitting means interconnecting said engines with said power transmission device for torque transmission thereto from each of said engines notwithstanding angular displacement thereof around the axes of said cardanic pivot means.

5. In an arrangement of power transmission elements and engines for ships having a plurality of separate engines transmitting power to a common propellor shaft by means of power transmission elements, the combination which comprises a main frame for said power transmission elements, means for supporting said main frame directly on hull portions of said ship independently of said separate engines, individual engine-supporting frames for at least some of said separate engines, cardanic pivot means for supporting one end of each said engine-supporting frame on said main frame for angular and translating movement with respect thereto, articulated support means for supporting the opposite end of each said engine-supporting frame on hull portions of said ship, and articulated torque transmission means interconnecting said engines with said transmission elements and adapted for accommodating angular and translating movements therebetween.

6. An arrangement as recited in claim 5 in which at least some of said plurality of separate engines are supported directly on said main frame.

7. An arrangement as recited in claim 5 in which said plurality of engines includes light weight high speed auxiliary engines and heavier lower speed main engines.

8. An arrangement as recited in claim 7 in which said light weight high speed engines are supported directly on said main frame.

9. An arrangement as recited in claim 5 in which said cardanic pivot means are arranged at two spaced points at said ends of said engine-supporting frames, and in which said articulated support means supports the opposite ends of said engine frames at but a single point.

10. An arrangement as recited in claim 5 which also includes watertight bulkheads separating at least some of said engines from said power transmission elements and others of said engines.

11. An arrangement as recited in claim 5 which also includes a watertight bulkhead separating at least some of said engines from said power transmission elements, and having said cardanic pivot means and said articulated torque transmission means penetrating said bulkhead in watertight fashion notwithstanding movements thereof with respect to said bulkhead.

12. An arrangement as recited in claim 11 in which said cardanic pivot means include pivot pins penetrating said bulkhead and sliding stuffing box means around said pivot pins for maintaining said watertight condition notwithstanding respective movement between said bulkhead and said pins.

13. An arrangment as recited in claim 11 in which said articulated torque transmission means penetrates said bulkhead through enlarged openings permitting relative movement therebetween, and in which said torque transmission means and said openings are enclosed within flexible watertight bellows.

14. An arrangment as recited in claim 5 in which said cardanic pivot means include pivot pins mounted and engaged between said transmission device frame and said engine-supporting frames, one end of each said pivot pin carrying a bushing the outer surface of which is at least in part spherical, and a journal with spherical bearing surfaces for engaging said bushing for limited free angular and rotational movement thereof.

15. An arrangement as recited in claim 14 in which said pivot pins are rigidly mounted on said transmission device frame and said journals are mounted on said engine-supporting frame for engaging said spherical bushings thereat.

16. An arrangement as recited in claim 14 in which said pivot pins are slidably engaged in said bushings for axial movement with respect thereto to an extent at least as much as the maximum change in the distance between said transmission device frame and said articulated support for the opposite ends of said engine-supporting frames during relative movements thereof.

17. An arrangement as recited in claim 5 in which said cardanic pivot means are disposed at a vertical level substantially below that of said torque transmission means.

No references cited.